United States Patent [19]

Lindell

[11] Patent Number: 4,612,017

[45] Date of Patent: Sep. 16, 1986

[54] PELLETIZING WOOD

[75] Inventor: Courtney D. Lindell, Bellingham, Wash.

[73] Assignee: Georgia-Pacific Corporation, Atlanta, Ga.

[21] Appl. No.: 427,440

[22] Filed: Sep. 29, 1982

Related U.S. Application Data

[63] Continuation of Ser. No. 235,599, Feb. 18, 1981, abandoned, which is a continuation-in-part of Ser. No. 187,705, Sep. 16, 1980, abandoned.

[51] Int. Cl.$^4$ ............................ C10L 5/06; C10L 5/20
[52] U.S. Cl. ...................................... 44/10 B; 44/16 F
[58] Field of Search ................ 44/10 A, 6, 16 F, 10 B

[56] References Cited

U.S. PATENT DOCUMENTS

| | | | |
|---|---|---|---|
| 1,359,074 | 11/1920 | Kingkinney | 44/23 |
| 1,564,142 | 12/1925 | Schwalbe | 44/16 R |
| 1,743,985 | 1/1930 | Strehlenert | 44/16 F |
| 3,227,530 | 1/1966 | Levelton | 44/1 |
| 3,492,134 | 1/1970 | Brummendorf | 44/14 |
| 3,635,684 | 1/1972 | Seymour | 44/10 R |
| 3,684,465 | 8/1972 | Hsu | 44/10 |
| 3,726,651 | 4/1973 | Ronden | 44/14 |
| 4,015,951 | 4/1977 | Gunnerman | 44/10 E |
| 4,230,459 | 10/1980 | Moreau et al. | 44/10 B |
| 4,234,320 | 11/1980 | Verschuur | 44/23 |
| 4,308,033 | 12/1981 | Gunnerman | 44/6 |

OTHER PUBLICATIONS

Annual Report of the Forest Research Laboratory, Oregon State University, Dec. 1973, p. 20.

Oregon Journal, "New Fuel Catches Fire", Saturday, Apr. 2, 1977.
Better Fibers, Jul. 1961, "Bark Pelleting . . . A New Solution to an Old Problem".
Georgia-Pacific Corporation Progress Report, Dec. 12, 1978, "Products from Bark Pellets".
"Charcoal—Fuel Logs—and Fine Constituents from Bark", Bark Conference, Oregon State University, Mar. 8 and 9, 1971.
"An Assessment of Current Bark Utilization Opportunities" by Raymond A. Currier, 27th Proceedings, Northwest Wood Products Clinic, 1972.
Terminal Progress Report, Jun. 1. 1968 to Jun. 30, 1972, "Utilization of Bark Waste" by Raymond A. Currier and Murray L. Laver, Oregon State University, Dec. 1972.
"Densified Wood and Bark Fuels", Oregon State University, Apr. 1977.
"Manufacturing Densified Wood and Bark Fuels", Special Report 490, Oregon State University Extension Service, Jul. 1977.
"Pellets from Sawmill Waste for Efficient Fuel", Paper given at Forest Products Research Society, 1972.
Chemical Abstracts, vol. 80 (1974), Abstract 147,647b.
Binding Material from Waste Sulphite Liquor, p. 65, Muller, P. G.—Binding Material from Sulphite Lyes.

*Primary Examiner*—Carl F. Dees
*Attorney, Agent, or Firm*—Banner, Birch, McKie & Beckett

[57] ABSTRACT

A process for pelletizing wood wherein the particulated wood is treated with a wax emulsion and lignosulfonate prior to pelleting is disclosed.

9 Claims, No Drawings

PELLETIZING WOOD

This application is a continuation of application Ser. No. 235,599, filed Feb. 18, 1981, which was a continuation-in-part of application Ser. No. 187,705, filed Sept. 16, 1980, (both abandoned).

This invention pertains to pelleting particulated wood. More particularly it pertains to pelleting wood which has been treated with a wax and lignosulfonate.

With the increase in cost of energy, greater efforts are presently being made to utilize wood waste for heating and generation of power to recover the energy present in the waste. A large portion of wood waste obtained from saw mills or other wood working plants or other sources is in various sizes and shapes which cannot be conveniently used, especially where mechanized and automated equipment is used. Generally the wood waste which is not in particulate form is reduced to particulate form and pelleted to obtain the waste in a uniform particle size which can be conveniently handled by automated equipment.

In pelleting the wood, often rotary ring die-type pellet mills are used wherein the particulated wood is compressed and forced through orifices in the die by stationary rollers positioned inside the ring die or conversely, the die is stationary and the rollers rotate. These types of mills have high capacity for pelleting the large quantity of wood waste available. In addition to the desirability of decreasing the power requirements in operation of the mills, the pellets formed must be of sufficient durability to withstand the handling encountered in transportation and use.

It is, therefore, an object of this invention to provide an improved process for pelleting of wood. A further object is to provide a process characterized by the production of wood pellets of improved durability. A still further object is to provide a process wherein an increase in production rates may be obtained with a decrease in power costs.

The above and other objects are attained by this invention which comprises drying the particulate wood to a moisture content less than about 19% and treating the particulate wood prior to pelleting with an aqueous wax emulsion and lignosulfonate. The particulate wood is treated with the wax emulsion and lignosulfonate in an amount, on the basis of the wax solids and lignosulfonate solids, of from about 0.25 to about 2.5 weight percent of the wood. The ratio of the wax emulsion to lignosulfonate used in such that the wax solids represent from about 5 to about 40% of the total solids. By treating the particulate wood with a wax and lignosulfonate, the production capacity of the mill may be increased with a reduction in power costs, as well as obtaining an improvement in the durability of the pellets and a decrease in the production of fines.

While the particulate wood may be treated with the wax emulsion and with a lignosulfonate solution separately, generally the wax emulsion and the lignosulfonate are intermixed to obtain a mixture which contains from about 35 to about 60 weight percent solids and is applied in one application. In preparation of the mixture, a wax emulsion may be simply intermixed with lignosulfonate solids or a lignosulfonate solution to obtain the desired mixture. Lignosulfonate is an emulsifier and a surfactant, so that, upon addition to the wax emulsion, it generally becomes a part of the emulsion. It is not necessary to use a wax emulsion. If desired, the wax emulsion may be formed by simply emulsifying the molten wax in a lignosulfonate solution. The latter requires a more involved operation than simply intermixing the lignosulfonate solution with a wax emulsion. Since the wax emulsions are generally available in concentrations of about 45 to about 50%, the desired mixture may be easily obtained by intermixing the wax emulsion with a lignosulfonate or spent sulfite liquor containing from about 45 to about 50% solids to obtain a mixture or a resulting emulsion which contains from about 35 to about 60% solids, preferably from about 45 to about 50%. The more concentrated mixtures are preferred since the treatment of the particulate wood with the mixture will result in less water being added to the wood. Mixtures containing from about 45 to about 50% solids are generally of sufficient concentration to result in a relatively small addition of water to the wood and are still of low enough viscosity for convenient handling and application. Mixtures over about 60% may be used, but generally at concentrations above 60% the viscosity is sufficiently high to make the application more difficult. Mixtures containing less than about 35% solids are seldom used since the resulting addition of water to the wood is generally higher than desired.

While the amount of wax present in the mixture with the lignosulfonate may be varied in an amount of from about 5 to about 40 weight percent, a wax content in the range of from about 15 to about 25 weight percent is preferred. All major classes of wax, including plant, animal (including insects), mineral (including petroleum), and synthetic waxes may be used in the preparation of the wax emulsion. Current economics favor the use of the mineral class of waxes, and more specifically, the petroleum waxes, paraffin and microcrystalline wax for this application. The melting point range and absorbancy on wood are the important porperties for good performance. Color, odor, saponification number, refractive index, etc., are not important criteria for this use. The melting point of the wax often will be in the range of from about 40° C. to about 80° C. Waxes having a melting point in the range of about 50° C. to 60° C. are preferred. It is desirable that the wax does not absorb readily into the wood particles and does not readily volatilize in storage. Generally wax emulsions which are commonly used in the paper and particle board industries may be employed.

The lignosulfonates used in preparation of the mixture for treating of particulate wood may be obtained by sulfonation of lignin obtained from may sources by the various known methods. One of the main sources of lignosulfonate is the residual pulping liquors of the paper and pulp industries where lignocellulosic material such as wood, straw, corn stalks, bagasse, and the like are processed to separate the cellulose or pulp from the lignin. In the sulfite pulping process the lingocellulosic material is digested with a bisulfite or sulfite to obtain a residual pulping liquor commonly referred to as "spend sulfite liquor" wherein the sulfonated lignin is dissolved. The lignosulfonate and other constituents of the spent sulfite liquor or sulfonated residual pulping liquor may be salts of cations such as magnesium, calcium, ammonium, sodium, potassium, and the like, depending upon the base used in the sulfonation process. The lignosulfonates or the liquors thus obtained may be used as such or may be converted by known methods to salts or complexes of other metals or cations other than those obtained in the sulfonation process. The products also as obtained usually contain many other constituents besides sulfonated lignin. For example, spent sulfite liquor generally contains from about 40 to about 60 weight percent of lignosulfonate with the remainder being carbohydrates and other organic and inorganic compounds dissolved in the liquor. While the non-lignin constituents may be removed by various known methods, it is not necessary to do so. The non-lignin constituents are not necessarily deleterious. Some in certain applications may even be beneficial.

The amount of the wax emulsion and lignosulfonate used in treating the wood and the ratio of wax to lignosulfonate solids used may be varied depending upon the species of wood being pelleted to obtain optimum results. With some of the woods, the durability of the pellets may be one of the main concerns while with others, such as western softwoods, the pellets obtained without the additive may be acceptable for many operations but the power requirements for the pelleting operation are excessive and the life of the die is relatively limited. Thus, for the latter higher wax content is desirable while for the former, such as hardwoods, lower wax content may be used. The extent of enhancement obtained by use of the additive will also vary with the species used, with some improvement being generally obtained for most soft and hardwoods and mixtures of waste woods which may contain many different species, bark and other lignocellulosic constituents.

The mixture or emulsion of wax and lignosulfonate is usually applied to the particulate wood after it has been dried to a moisture content of less than about 19%, preferably dried to a moisture content in the range of from about 12 to about 16% or less. Usually the mixture of the wax and lignosulfonate is sprayed upon the dried products at the conditioning chamber prior to being fed into the pelleting machine. The pelleting mills often use paddle conveyors or other means to feed the particulate wood into the pelleting die so that the treated wood particles are mixed prior to pelleting to obtain a sufficiently uniform mixture. The wax and lignosulfonate mixture or emulsion may also be applied to the wood particles prior to drying. However, when this procedure is used the conditions and methods used in the drying operation are limited. Thus, it is generally preferred to dry the particles prior to the application of the mixture of wax and lignosulfonate taking into account during the drying operation of the additions of water which will be made by the treatment of the particles with the mixture. Except for the treating step discussed above, other procedures normally used in pelleting of wood may be followed.

The invention is further illustrated by the following examples.

EXAMPLE I

A bench scale rotary ring pellet mill was used in production of pellets using a ring die in which the orifices were 3/16 inch in diameter and the die had a thickness of 1½ inches. The bench scale model was operated on samples of ground white fir which were mixed with different additives prior to pelletizing. The pellet mill was driven by a two horsepower motor at constant rpm and was equipped with an ammeter to show the amperage necessary for operation of the mill during the pelleting operation. The mill was equipped with a hopper with a paddle feed located at the bottom. The ground wood was fed into the mill by use of the paddle feed. The feed rate was adjustable, but was set at one rate for the runs made. Pellets were collected in the bucket of the pellet mill discharge and weighed.

The durability of the pellets was tested by screening the pellets on a 5 mesh Tyler screen and then taking a 100 gram sample of pellets remaining on the screen and shaking the sample in a can on a paint mixer for 4 minutes. After shaking, the sample was again screened on a 5 mesh Tyler screen and the percentage of the sample retained on the screen was reported as the durability of the sample. The material which passed through the screen on the first screening was weighed and the amount of fines thus obtained was expressed in grams of fines obtained per 100 grams of pellets.

In the tests made on the bench model pellet mill, the white fir ground wood was pelleted without any additive and also where the particulated wood was treated with a wax emulsion alone and also with a lignosulfonate solution by itself. The results obtained above were compared to the results obtained where a wax-lignosulfonate emulsion was used. In the run where wax emulsion was used, the wax content of the emulsion was about 47 weight percent. The lignosulfonate solution contained about 50% solids. In preparation of the wax-lignosulfonate emulsion the wax emulsion used above and the lignosulfonate solution described above were used. It was prepared by mixing 20% by weight of the wax emulsion with 80% of the lignosulfonate solution. Since the solids of the lignosulfonate solution (a fermented calcium base spent sulfite liquor) contained about 80% lignosulfonate, the wax content of the mixture was about 24 weight percent of the total wax and lignosulfonate solids in the mixture.

Tests were also made using jack pine with and without the above additive.

The results obtained for the runs made are shown in the table below.

TABLE I

| Run | Wood Type | Moisture Content of Particulated Wood | Additive | Amount Additive Used, % | Power Demand, Amp. | Production Rate, g/min | Fines, g/100 g | Durability % |
|---|---|---|---|---|---|---|---|---|
| Control 1 | White Fir | 16.8 | — | — | 5.0 | 121.7 | .5 | 97.8 |
| Control 2 | White Fir | 17.0 | Wax Emulsion | 1% | 4.8 | 108.3 | .25 | 98.2 |
|  | White Fir | 15.4 | Lignosulfonate Solution | 1% | 7.0 | 127.5 | .75 | 98.0 |
| Control 3 | White Fir | 15.2 | Lignosulfonate Solution | 3% | 4.6 | 92.5 | .25 | 99.0 |
| 1 | White Fir | 16.4 | Wax-lignosulfonate Emulsion | 1% | 5.0 | 124.5 | 0 | 98.5 |
| 2 | White Fir | 17.0 | Wax-lignosulfonate Emulsion | 3% | 4.5 | 130.8 | 0 | 99.0 |

TABLE I-continued

| Run | Wood Type | Moisture Content of Particulated Wood | Additive | Amount Additive Used, % | Power Demand, Amp. | Production Rate, g/min | Fines, g/100 g | Durability % |
|---|---|---|---|---|---|---|---|---|
| Control | Jack Pine | 17.0 | — | — | 3.6 | 94.8 | .25 | 97.5 |
| 3 | Jack Pine | 17.4 | Wax-lignosulfonate Emulsion | 1% | 3.6 | 95.6 | 0 | 98.5 |
| 4 | Jack Pine | 16.6 | Wax-lignosulfonate Emulsion | 3% | 3.5 | 98.1 | 0 | 98.0 |

EXAMPLE II

A production scale test was made using a production pellet mill which was driven by a 250 horsepower motor. A rotary die contained orifices of 3/16 inch in diameter and had a thickness of 1½ inches through which the wood was forced. The pellet mill had a conditioning chamber. The wax-lignosulfonate emulsion was sprayed on the wood particles in the conditioning chamber. The moisture content of the ground wood and product pellets was measured by a bench type moisture meter.

In making the test runs, the operator set the pellet machine at a maximum power load of 270 amperes. The machine was operated using white fir particulated wood without any additive at this setting and the durability and rate of production determined. After this determination was made, the particulated wood was treated with a wax-lignosulfonate emulsion in an amount of 1.7 weight percent of the particulated wood. The wax-lignosulfonate emulsion was prepared in the manner described above by mixing the wax emulsion described above in an amount of 20 weight percent with 80% of the 50% lignosulfonate solution. Upon treatment of the particulated wood with the wax-lignosulfonate emulsion, the power demand dropped and the operator increased the feed to the mill until a power demand of 200 amperes was being used by the machine. The production rate on particulated wood without the additive was 2.8 tons per hour utilizing a power demand of 270 amperes. Upon addition of the additive, the production rate increased to 5.2 tons per hour and the power demand was 200 amperes. The durability of the pellets without the additive was 94.5% while that with the additive was 92.8%. The fines were not determined. The moisture content for the wood during the control was 9 weight percent and at the time the pellets were treated with the wax-lignosulfonate emulsion the moisture content was 8%.

In pelleting Douglas fir, without the additive the production rate was 1.6 tons per hour on a power demand of 200 amperes. With additive added in an amount of 1.7 weight percent of the wood, the production rate increased to 2.8 tons per hour on a power demand of 190 amperes. The durability of the pellets without the additive was 92% and 92.6% with the additive.

After the treatment of the particulate wood with the wax-lignosulfonate mixture or emulsion was discontinued, the amperage on the pelleting mill after about 7 minutes began to increase and was up to 270 amperes in about 10 minutes.

I claim:

1. A process for pelletizing particulated wood in a ring die pelleting mill which comprises drying the particulated wood to a mositure content less than about 19 weight percent and treating the particulated wood prior to pelleting with an aqueous wax emulsion and lignosulfonate, and particulated wood being treated with the wax emulsion and lignosulfonate in an amount, on the basis of wax solids and lignosulfonate solids, of from about 0.25 to about 2.5 weight percent of the wood with the wax solids being present in an amount of from about 5 to about 40 weight percent of the total wax and lignosulfonate solids.

2. A process according to claim 1 wherein the wax emulsion and the lignosulfonate are premixed prior to treatment of the wood particles to form an aqueous mixture containing from about 35 to about 60 weight percent solids.

3. A process according to claim 2 wherein softwoods are being pelleted.

4. A process according to claim 2 wherein the emulsion of the wax and lignosulfonate contains from about 45 to about 50 weight percent solids.

5. A process according to claim 2 wherein the wax content of the mixture is from about 15 to about 25 weight percent of the total solids in the mixture.

6. A process according to claim 4 wherein the wax emulsion contains from about 45 to about 50 weight percent solids.

7. A process according to claim 6 wherein the dried particulated wood is treated with from about 1 to about 3 weight percent of the aqueous mixture.

8. A process according to claim 7 wherein the particulated wood is dried to a moisture content in the range of from about 12 to about 16%.

9. A process according to claim 8 wherein the particulated wood is a softwood species.

* * * * *